US012743240B2

(12) United States Patent
Guo et al.

(10) Patent No.: US 12,743,240 B2
(45) Date of Patent: Sep. 22, 2026

(54) TRAFFIC SCHEDULING CONTROL METHOD AND DEVICE BASED ON ZONED STORAGE DEVICE, AND STORAGE MEDIUM

(71) Applicant: Beijing Volcano Engine Technology Co., Ltd., Beijing (CN)

(72) Inventors: Zhihong Guo, Beijing (CN); Jiale Gao, Beijing (CN); Jinxin Liu, Beijing (CN); Chengyu Dong, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 19/171,635

(22) Filed: Apr. 7, 2025

(65) Prior Publication Data

US 2026/0003528 A1 Jan. 1, 2026

(30) Foreign Application Priority Data

Jun. 28, 2024 (CN) ........................ 202410869778.X

(51) Int. Cl.
*G06F 3/06* (2006.01)
*G06F 12/02* (2006.01)

(52) U.S. Cl.
CPC .......... *G06F 3/0659* (2013.01); *G06F 3/0613* (2013.01); *G06F 3/0644* (2013.01); *G06F 3/0652* (2013.01); *G06F 3/0679* (2013.01); *G06F 12/0246* (2013.01); *G06F 12/0253* (2013.01); *G06F 2212/7205* (2013.01)

(58) Field of Classification Search
None
See application file for complete search history.

(56) References Cited

U.S. PATENT DOCUMENTS 9,128,820 B1 * 9/2015 Malina ................ G06F 12/0238
11,625,181 B1 * 4/2023 Bernat .................. G06F 3/0685 711/154
2013/0138912 A1 5/2013 Bux et al.
(Continued)

FOREIGN PATENT DOCUMENTS

CN 109977032 A 7/2019
CN 114996173 A 9/2022
(Continued)

OTHER PUBLICATIONS

Translation of WO-2025097979-A1. 2026.*
(Continued)

*Primary Examiner* — Nathan Sadler
(74) *Attorney, Agent, or Firm* — Alleman Hall LLP

(57) ABSTRACT

Embodiments of the present disclosure provide a traffic scheduling control method and device based on a zoned storage device, and a storage medium. The method includes: determining, based on a garbage data ratio and a valid data ratio of a current zone to be collected of the zoned storage device, a target ratio of a throughput for writing data in a garbage collection process of the current zone to be collected to a throughput for writing data to the zoned storage device by a user; and controlling, based on the target ratio, the zoned storage device to process a first class request for writing data in the garbage collection process and a second class request for writing data to the zoned storage device by the user.

20 Claims, 4 Drawing Sheets

(56) References Cited

U.S. PATENT DOCUMENTS

| | | | | |
|---|---|---|---|---|
| 2017/0024137 | A1* | 1/2017 | Kanno | G11C 29/52 |
| 2017/0351604 | A1 | 12/2017 | Tang et al. | |
| 2021/0073121 | A1 | 3/2021 | He et al. | |
| 2022/0365875 | A1 | 11/2022 | Mao et al. | |
| 2024/0061576 | A1* | 2/2024 | Zhou | G06F 3/0608 |
| 2026/0003785 | A1* | 1/2026 | Gao | G06F 12/0246 |

FOREIGN PATENT DOCUMENTS

| | | | | |
|---|---|---|---|---|
| CN | 116700634 A | | 9/2023 | |
| CN | 118227058 A | | 6/2024 | |
| CN | 119065595 B | | 7/2025 | |
| WO | WO-2025097979 A1 | * | 5/2025 | G06F 3/06 |

OTHER PUBLICATIONS

European Patent Office, Extended European Search Report Issued in Application No. 25168405.6, Sep. 19, 2025, Germany, 13 pages.

"Write amplification," Wikipedia, Available Online at https://en.wikipedia.org/w/index.php?title=Write_amplification&oldid=1220464337, retrieved on Sep. 2, 2025, 14 pages.

* cited by examiner

TRAFFIC SCHEDULING CONTROL METHOD AND DEVICE BASED ON ZONED STORAGE DEVICE, AND STORAGE MEDIUM

CROSS-REFERENCE TO RELATED APPLICATION(S)

This application claims priority to Chinese Application No. 202410869778.X filed on Jun. 28, 2024, the disclosure of which is incorporated herein by reference in its entirety.

FIELD

Embodiments of the present disclosure relate to the technical fields of computers and network communications, and in particular, to a traffic scheduling control method and device based on a zoned storage device, and a storage medium.

BACKGROUND

For a Zoned Storage (ZNS) device, a storage region inside the whole storage device such as a Solid State Disk (SSD) is divided into a plurality of zones. Each zone manages a Logical Block Address (LBA), and data among different zones can be independent. Only sequential writing is allowed in the zones, and the zones can be read randomly. A storage space of the zoned storage device needs to be arranged through a garbage collection (GC) process, in which a valid data segment in any zone is moved to another zone, and the original zone is erased. In the garbage collection process, valid data will be read and written into a new zone. In order not to affect the write performance by a user to a maximum extent, a data write speed during garbage collection and a data write speed by the user need to be balanced, to keep a remaining space of the zoned storage device stable. Furthermore, the writing by the user can be satisfied.

The prior art usually uses a traditional network Quality of Service (QOS) control strategy such as Weighted Fair Queuing (WFQ) or Class-Based WFQ in a case that the zoned storage device balances the data write speed during the garbage collection and the data write speed of the user. However, these control strategies cannot guarantee the stability of control of the zoned storage device and cannot fully use the optimal performance of the zoned storage device.

SUMMARY

Embodiments of the present disclosure provide a traffic scheduling control method and device based on a zoned storage device, and a storage medium.

In a first aspect, the embodiments of the present disclosure provide a traffic scheduling control method based on a zoned storage device, including: determining, based on a garbage data ratio and a valid data ratio of a current zone to be collected of the zoned storage device, a target ratio of a throughput for writing data in a garbage collection process of the current zone to be collected to a throughput for writing data to the zoned storage device by a user; and controlling, based on the target ratio, the zoned storage device to process a first class request for writing data in the garbage collection process and a second class request for writing data to the zoned storage device by the user.

In a second aspect, the embodiments of the present disclosure provide a traffic scheduling control device based on a zoned storage device, including: a determining unit configured to determine, based on a garbage data ratio and a valid data ratio of a current zone to be collected of the zoned storage device, a target ratio of a throughput for writing data in a garbage collection process of the current zone to be collected to a throughput for writing data to the zoned storage device by a user; and a controlling unit configured to control, based on the target ratio, the zoned storage device to process a first class request for writing data in the garbage collection process and a second class request for writing data to the zoned storage device by the user.

In a third aspect, the embodiments of the present disclosure provide an electronic device, including: at least one processor and a memory. The memory stores computer-executable instructions; and the at least one processor is configured to execute the computer-executable instructions stored in the memory to cause the at least one processor to perform the traffic scheduling control method based on the zoned storage device in the first aspect and in various possible designs of the first aspect.

In a fourth aspect, the embodiments of the present disclosure provide a computer-readable storage medium. The computer-readable storage medium stores computer-executable instructions which, when executed by a processor, implement the traffic scheduling control method based on the zoned storage device in the first aspect and in various possible designs of the first aspect.

In a fifth aspect, the embodiments of the present disclosure provide a computer program product, including computer-executable instructions which, when executed by a processor, implement the traffic scheduling control method based on the zoned storage device in the first aspect and in various possible designs of the first aspect.

BRIEF DESCRIPTION OF THE DRAWINGS

To describe the technical solutions in the embodiments of the present disclosure or in the prior art more clearly, the following briefly introduces the accompanying drawings for describing the embodiments or the prior art. Apparently, the accompanying drawings in the following description show merely some embodiments of the present disclosure, and a person of ordinary skill in the art may still derive other drawings from the accompanying drawings without creative efforts.

DETAILED DESCRIPTION OF EMBODIMENTS

Figure 1:
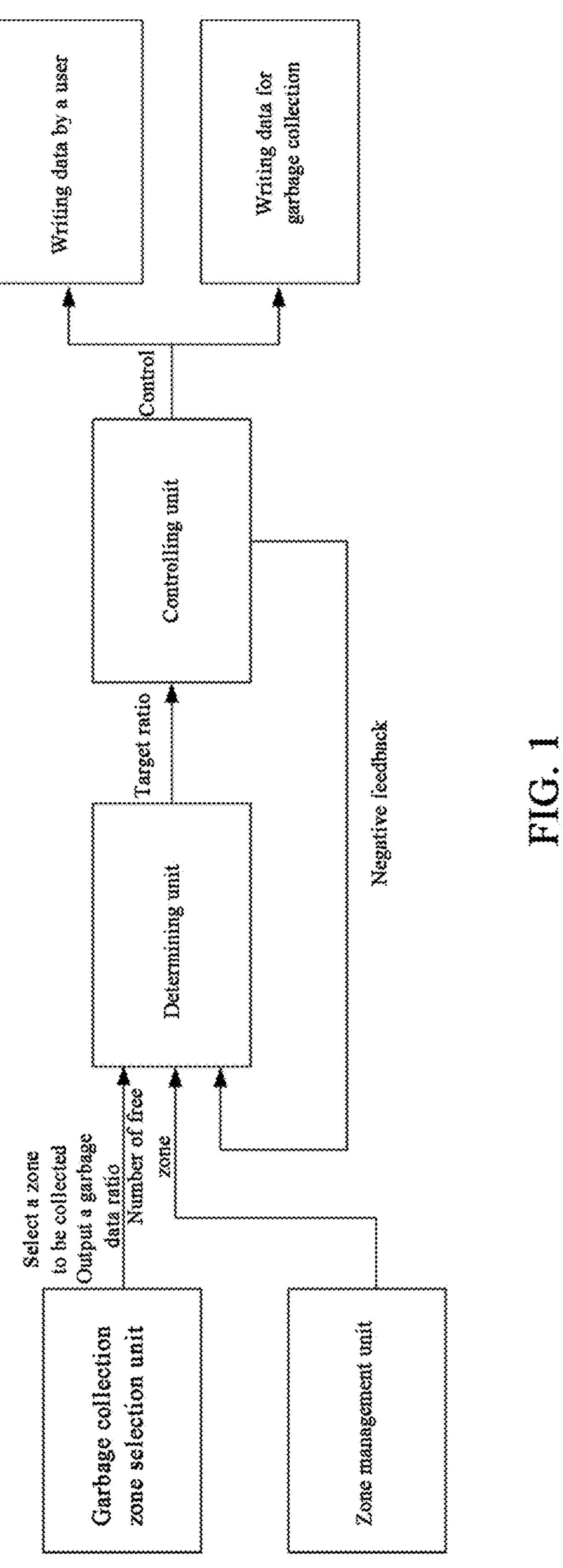
FIG. 1 is an example diagram of a system architecture of a traffic scheduling control method based on a zoned storage device according to an embodiment of the present disclosure.

In order to make the objectives, technical solutions, and advantages of the embodiments of the present disclosure clearer, the technical solutions in the embodiments of the present disclosure are clearly described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

A zoned storage device divides a storage region inside a storage device such as a solid state disk into a plurality of zones. Each zone manages a logical block address, and data between different zones can be independent. Only sequential writing is allowed in the zones, and the zones can be read randomly.

In order to ensure sequential writing in the zones, in response to a logical block address needing to be overwritten in the zoned storage device, data of a current address needs to be cleared before this logical block address is sequentially rewritten.

A state of each zone is controlled by a state machine, and the state of the zone can only be empty (unused)→open (erased, currently having no data)→full (filled of data) →empty (unused). A zone in the empty state is changed to the open state by being activated. After being filled with data, the zone is changed to the full state by an end command, and is changed to the empty state again by a reset command.

The smallest unit managed by a standalone storage engine is a chunk. A size of a chunk is generally 64 MB, which is much less than a size of a zone (several GB). Therefore, a plurality of chunks need to be aggregated into one zone and written in sequence. After a system has been run stably for a period of time, some chunks in a zone have been deleted by a top-layer user. In the user's view, a logical space has been released. However, an actual physical space is not enlarged. In a case that the user continues to write data, these spaces need to be organize, to move and aggregate valid chunks to a new zone, and directly erase the old zone. This is a garbage collection process. In a case that the user continuously deletes old data and writes new data, this process needs to be ongoing. Moving in garbage collection is continued to be performed with the writing of data by the user. In order to minimize the impact on the write performance of the user, a garbage collection speed and a data write speed of the user need to be balanced, so that a remaining space of the zoned storage device remains stable and the writing of the user can be satisfied.

The prior art usually uses a traditional network Quality of Service (QOS) control strategy such as Weighted Fair Queuing (WFQ) or Class-Based WFQ in a case that the zoned storage device balances the data write speed during the garbage collection and the data write speed of the user. However, these control strategies cannot guarantee the stability of control of the zoned storage device and cannot fully use the optimal performance of the zoned storage device.

The QoS control strategy provides a function of ensuring a lower limit and limiting an upper limit. In a case that the control strategy is applied to traffic scheduling control based on a zoned storage device, the control strategy needs to meet the following requirements.

1) The function of ensuring a lower limit and limiting an upper limit needs to be provided, and dynamic adjustment is supported. For example, in a case of different numbers of free zones in zoned storage devices, a bandwidth for ensuring a lower limit should be dynamically adjusted to satisfy a speed of releasing a space for garbage collection.
2) Scheduling can be performed based on priorities in different scenarios of writing data by a user.

However, in practical applications, it has been found that the QoS control strategy has at least the following problems.

1) In response to one of garbage collection and data writing by a user having low capability of submitting a request, only limiting an upper limit can be satisfied, but ensuring a lower limit cannot be satisfied, so that the one may maintain the speed at the upper limit, and the other one may be at a speed less than the lower limit, resulting in an imbalance between a garbage collection speed and a speed of writing data by a user and an impact on the stability.
2) A system bandwidth needs to be set, but a real system bandwidth is completely different in response to data volume of writing data requested by a user each time being different. For example, in response to the data volume (iosize) of the writing data requested by the user in each time being 64 KB, the system bandwidth is about 3.4 GB; and in response to the data volume of the each time requested by the user in each time being 16 KB, the system bandwidth is about 1.6 GB. In a mixed case, it is impossible to estimate the system bandwidth. Therefore, in response to control being performed based on a bandwidth, only a maximum bandwidth of garbage collection and a maximum bandwidth of data writing by a user can be limited, and an actual bandwidth ratio of the garbage collection to the data writing by the user cannot be precisely controlled. This results in that, the number of free zones in the zoned storage device can be controlled, but there are many free zones, the bandwidth of data writing by a user is small, and the system is unstable; or the number of free zones of the zoned storage device cannot be controlled, and is finally reduced to a value that a user cannot write data, so that the bandwidth of data writing by a user is reduced to 0.

In order to solve the above at least one of the technical problems, the present disclosure provides a traffic scheduling control method based on a zoned storage device. The method includes: determining, based on a garbage data ratio and a valid data ratio of a current zone to be collected of the zoned storage device, a target ratio of a throughput for writing data in a garbage collection process of the current zone to be collected to a throughput for writing data to the zoned storage device by a user; and controlling, based on the target ratio, the zoned storage device to process a first class request for writing data in the garbage collection process and a second class request for writing data to the zoned storage device by the user. A garbage collection speed and a speed of writing data to the zoned storage device by the user are controlled based on the determined target ratio, to ensure the stability of a number of free zones of the zoned storage device, thereby ensuring the stability of the zoned storage device and fully using the data write performance of the zoned storage device.

The traffic scheduling control method based on the zoned storage device of the present disclosure is applied to the system architecture shown in FIG. 1. The system architecture includes a garbage collection zone selection unit, a zone management unit, a determining unit, a controlling unit, and the like, The garbage collection zone selection unit is configured to select a current zone to be collected, and can further output a garbage data ratio and/or a valid data ratio.

The zone management unit can be configured to count a number of free zones. The determining unit can determine a target ratio of a throughput for writing data in a garbage collection process of the current zone to be collected to a throughput for writing data to the zoned storage device by a user. The controlling unit can control, based on the target ratio, the zoned storage device to process a request for writing data in the garbage collection process and a request for writing data to the zoned storage device by the user, thus controlling a garbage collection speed and a speed of writing data to the zoned storage device by the user. In addition, in an execution process, the controlling unit may further in turn affect the determining unit based on some information as a negative feedback which affects a control result.

It should be noted that user information (including but not limited to user device information and user personal information) and data (including but not limited to data for analysis, stored data, displayed data, and the like) involved in the present application are information and data which are authorized by the user or fully authorized by all parties. Furthermore, acquisition, use, and processing of relevant data all comply with relevant laws, regulations, and standards in relevant countries and districts, and corresponding operation entries are provided for the user for authorization or refuse selection.

The following will provide a detailed introduction to the traffic scheduling control method based on the zoned storage device of the present disclosure in conjunction with specific embodiments.

Figure 2:
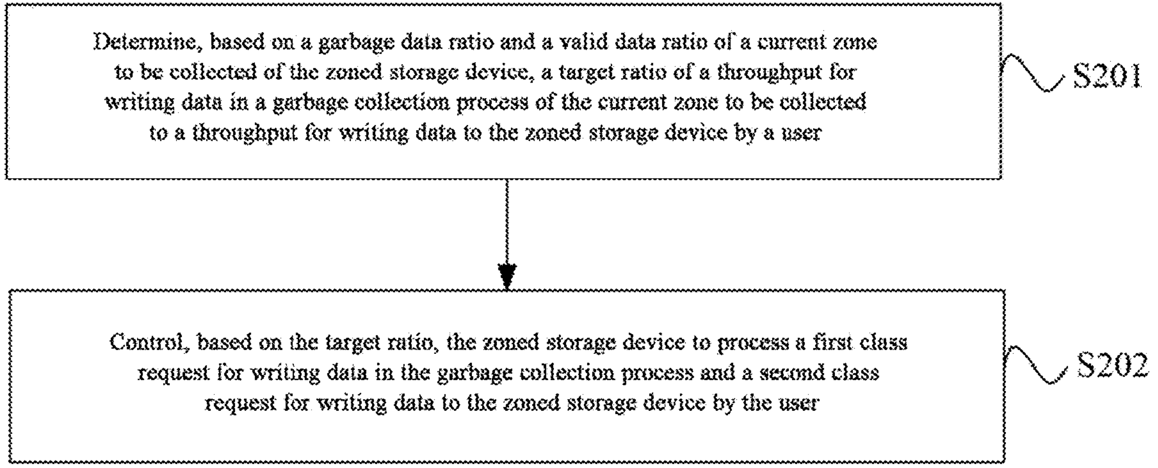
FIG. 2 is a flowchart of a traffic scheduling control method based on a zoned storage device according to an embodiment of the present disclosure.

Referring to FIG. 2, FIG. 2 is a flowchart of a traffic scheduling control method based on a zoned storage device according to an embodiment of the present disclosure. The method of this embodiment can be applied to an electronic device such as a terminal device or a server. The traffic scheduling control method based on the zoned storage device includes the followings.

At S201, based on a garbage data ratio and a valid data ratio of a current zone to be collected of the zoned storage device, a target ratio of a throughput for writing data in a garbage collection process of the current zone to be collected to a throughput for writing data to the zoned storage device by a user is determined.

In this embodiment, a control index required by scheduling control of the zoned storage device can be a ratio of a bandwidth of writing data in the garbage collection process to a total written bandwidth, i.e.:

GCbandwidth/(GCbandwidth+HOSTbandwidth)

where GCbandwidth represents a written bandwidth occupied in the garbage collection process, and HOSTbandwidth represents a written bandwidth occupied in the process of writing data to the zoned storage device by the user. GCbandwidth+HOSTbandwidth represents the total written bandwidth.

In specific implementation, the scheduling control can be performed on the zoned storage device based on the garbage data ratio and/or the valid data ratio of the current zone to be collected.

To maintain the stability of the zoned storage device and keep a number of free zones unchanged or changing little, a balance needs to be achieved between production and consumption of the free zones. The garbage collection process is both a producer of free zones and a consumer of free zones, and the process of writing data to the zoned storage device by the user is a consumer of free zones.

Considering that in a case that the garbage collection process moves valid data in the zone to be collected and collects the current zone to be collected, a free zone may be produced, but at the same time, the valid data needs to occupy another free zone. Therefore, after the garbage collection process completes the collection of the zone to be collected, only a space that is occupied by garbage data in the zone is actually produced. Within this period of time of collection of the zone to be collected, the process of writing data to the zoned storage device by the user can only consume a space that has the same size as the space occupied by the garbage data, to maintain the stability of the number of free zones. In response to the process of writing data to the zoned storage device by the user consuming a space that has a size greater than the size of the space occupied by the garbage data, the number of free zones may continue to decrease. The throughput for writing data to the zoned storage device by the user is high, and the zoned storage device cannot run stably for a long time. In response to the process of writing data to the zoned storage device by the user consuming a space that having a size less than the size of the space occupied by the garbage data, the number of free zones may continue to increase. The throughput for writing data to the zoned storage device by the user is low. As a result, the performance of writing data by a user does not reach the desired performance. Therefore, in this embodiment, the target ratio of the throughput for writing data in the garbage collection process to the throughput for writing data to the zoned storage device by the user is determined based on the garbage data ratio and the valid data ratio in the current zone to be collected of the zoned storage device. Thus, it ensures both the data write performance in the garbage collection process and the performance of writing data to the zoned storage device by the user, and ensures that the number of free zones in the zoned storage device remains stable.

Specifically, to determine the target ratio, a ratio between the valid data ratio of the current zone to be collected and the garbage data ratio of the current zone to be collected can be obtained and determined to be the target ratio, and a specific formula thereof can be as shown below:

$$\frac{X}{Y} = \frac{validratio}{1 - validratio} = \frac{1 - garbageratio}{garbageratio} = \frac{validratio}{garbageratio}$$

where X represents the throughput for writing data in the garbage collection process of the current zone to be collected; Y represents a throughput for writing data to the zoned storage device by the user in the garbage collection process of the current zone to be collected; validratio represents the valid data ratio of the current zone to be collected; and garbageratio represents the garbage data ratio of the current zone to be collected, where a sum of validratio and garbageratio is 1. Therefore, in reality, in response to any ratio of validratio and garbageratio being obtained, the other ratio can be easily obtained.

In an example, the validratio of the current zone to be collected is 75%, and the garbageratio is 1-75%, so the target ratio is X/Y=75%/25%=3:1.

It should be noted that as different zones to be collected are collected, the garbage data ratio and valid data ratio of each zone to be collected may be different. Therefore, the corresponding target ratio also varies during garbage collection of different zones to be collected.

At S202, the zoned storage device is controlled, based on the target ratio, to process a first class request for writing data in the garbage collection process and a second class request for writing data to the zoned storage device by the user.

In this embodiment, during the garbage collection of the current zone to be collected, the throughput for writing data in the garbage collection process and the throughput for writing data to the zoned storage device by the user can be controlled based on the target ratio, so that the throughput ratio is the target ratio. In other words, the ratio of the throughput for writing data in the garbage collection process and the throughput for writing data to the zoned storage device by the user is controlled to reach the target ratio by controlling the zoned storage device to process the first class request for writing data in the garbage collection process and the second class request for writing data to the zoned storage device by the user.

The processing of the first class request is specifically to read out some valid data involved in the first class request in the current zone to be collected and write the valid data into another writable zone, and the processing of the second class request is specifically to write an input entered by the user into a writable zone.

Figure 3:
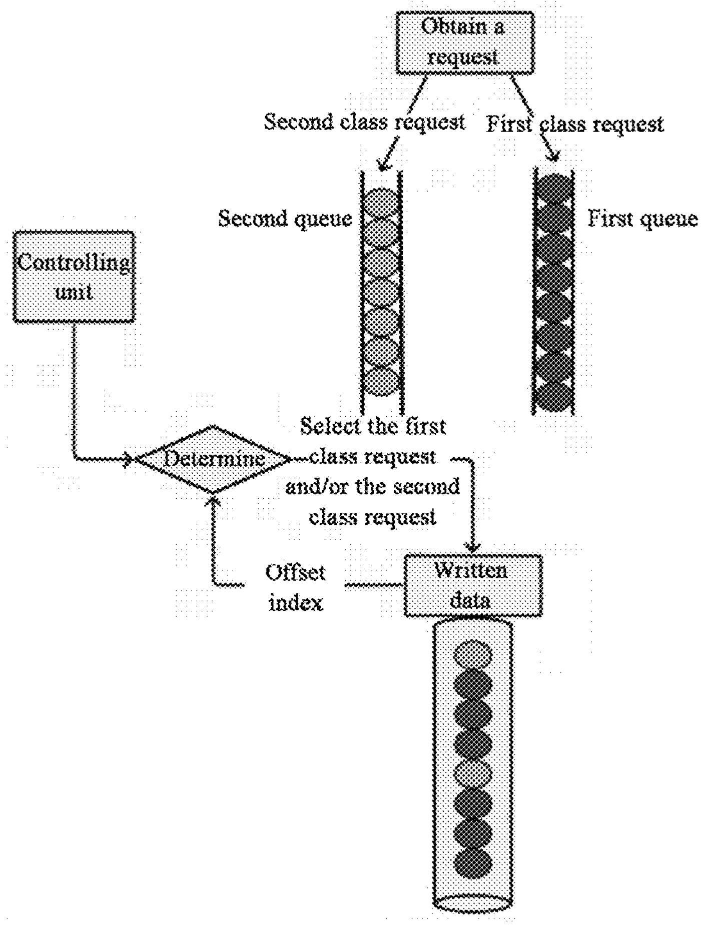
FIG. 3 is a flowchart of a traffic scheduling control method based on a zoned storage device according to another embodiment of the present disclosure.

Optionally, a plurality of first class requests may be produced in the garbage collection process of the current zone to be collected, and there may also be a plurality of second class requests during writing data to the zoned storage device by the user. Therefore, in this embodiment, as shown in FIG. 3, the first class requests can be added into a first queue, and the second class requests can be added into a second queue. Thus, the zoned storage device may be controlled, based on the target ratio, to obtain, from the first queue and/or the second queue, a request included in the first queue and/or the second queue and process the request, to realize scheduling the first class request and the second class request based on the target ratio and controlling the throughput for writing data in the garbage collection process and the throughput for writing data to the zoned storage device by the user.

It should be noted that since a current maximum written bandwidth threshold of the zoned storage device cannot be evaluated accurately, in this embodiment, the zoned storage device can be controlled based on the target ratio to process the first class request and the second class request. The current maximum written bandwidth threshold is obtained by exploration, so that it ensures that the current maximum written bandwidth can be fully used. The specific processes can be as follows.

The request included in the first queue and/or the second queue is obtained from the first queue and/or the second queue, within a current sub time period within current unit time, and the request is processed; an actual ratio of a cumulative data volume of data written in the garbage collection processes, within the current sub time period and a historical sub time period in the current unit time, to a cumulative data volume of data written by the user to the zoned storage device is determined, and an offset index between the actual ratio and the target ratio is determined; and the zoned storage device is controlled based on the offset index to continue to obtain, from the first queue and/or the second queue, a request included in the first queue and/or the second queue, within a next sub time period, until a total cumulative data volume of data written within the current unit time reaches a maximum written bandwidth threshold of the current unit time.

In this embodiment, considering that the maximum written bandwidth threshold is a maximum data volume of data that can be written within unit time, the maximum written bandwidth threshold can be controlled by short sub time periods (e.g. milliseconds or microseconds) in a duration range of a unit time, so that the total cumulative data volume of data written in respective sub time periods of the unit time reaches the maximum written bandwidth threshold. After the request is obtained from the first queue and/or the second queue in the current sub time period of the current unit time and is processed, the cumulative data volume of data written in the garbage collection processes, in the current sub time period and the historical sub time period in the current unit time, and the cumulative data volume of data written by the user to the zoned storage device can be determined. Then, the actual ratio of the two cumulative data volumes is calculated, and a deviation between the actual ratio and the target ratio is determined and denoted as the offset index. Then, obtaining a request from the first queue and/or the second queue within the next sub time period after the current sub time period is guided based on the offset index, and the offset index is updated after the processing within the next sub time period is completed, to continue to guide subsequent sub time periods. By using the above exploration mode, the processing of the first class request and the second class request in the current unit time can be stopped until the total cumulative data volume of data written in the current unit time reaches the maximum written bandwidth threshold of the current unit time, to realize that the maximum written bandwidth is properly allocated based on the target ratio, specifically as shown in FIG. 3.

For example, in response to the actual ratio being determined to be greater than the target ratio based on the offset index, and the deviation is too large (specifically, the offset index is greater than a first offset index threshold which is positive), in other words, in response to the cumulative data volume of data written in the garbage collection process being too large, and the cumulative data volume of data written by the user to the zoned storage device is too small, only the second class request is obtained from the second queue within next sub time for processing. In response to the actual ratio being determined to be less than the target ratio based on the offset index, and the deviation being too large (specifically, the offset index is less than a second offset index threshold which is negative), in other words, in response to the cumulative data volume of data written in the garbage collection process being too small, and the cumulative data volume of data written by the user to the zoned storage device being too large, only the first class request is obtained from the first queue within the next sub time for processing. In response to the offset index being between the first offset index threshold and the second offset index threshold, it indicates that the deviation between the actual ratio and the target ratio is within an acceptable range, the first class request and the second class request can be obtained from the first queue and the second queue within the next sub time period respectively for processing.

The offset index only needs to reflect a direction and magnitude of the deviation between the actual ratio and the target ratio, and can be calculated using any feasible calculation method, without limitation here.

Based on the traffic scheduling control method based on the zoned storage device provided in the embodiments of the present disclosure, the method includes: determining, based on a garbage data ratio and a valid data ratio of a current zone to be collected of the zoned storage device, a target ratio of a throughput for writing data in a garbage collection process of the current zone to be collected to a throughput for writing data to the zoned storage device by a user; and controlling, based on the target ratio, the zoned storage device to process a first class request for writing data in the garbage collection process and a second class request for writing data to the zoned storage device by the user. A garbage collection speed and a speed of writing data to the zoned storage device by the user are controlled based on the determined target ratio, to ensure the stability of a number of free zones of the zoned storage device, thereby ensuring the stability of the zoned storage device and fully using the data write performance of the zoned storage device.

Based on any one of the above embodiments, based on the garbage data ratio and the valid data ratio of the current zone to be collected of the zoned storage device, the target ratio of the throughput for writing data in the garbage collection process of the current zone to be collected to the throughput for writing data to the zoned storage device by the user being determined, in S201, may specifically include the followings.

An average garbage data ratio of the garbage data ratio of the current zone to be collected and garbage data ratios of a preset number of historical collected zones is obtained, and an average valid data ratio of the valid data ratio of the current zone to be collected and valid data ratios of a preset number of historical collected zones is obtained; and the target ratio of the throughput for writing data in the garbage collection process of the current zone to be collected to the throughput for writing data to the zoned storage device by the user is determined based on the average garbage data ratio and the average valid data ratio.

In this embodiment, garbage collection not only has a function of compressing valid chunks, but also has a function of compressing a metadata index space in a small iosize pattern. Therefore, the principle for selecting a zone to be collected is usually using a garbage rate as a main factor and using other factors as auxiliary factors. In response to the metadata index space expanding severely, a metadata volume on a zone may be used as a main factor. In this case, the garbage data ratio in the selected zone to be collected may be low or there may be no garbage. In response to a zone to be collected that uses compressing a metadata space as a main factor being suddenly selected, the target ratio may change dramatically, which may lead to a drastic change in a number of free zones in the zoned storage device. To ensure the stability of the system, in this embodiment, an average value, i.e., the average garbage data ratio, of the garbage data ratio of the current zone to be collected and the garbage data ratios of the preset number of historical collected zones can be obtained, and similarly, an average value, i.e., the average valid data ratio, of the valid data ratio of the current zone to be collected and the valid data ratios of the preset number of historical collected zones can be obtained. Then, the target ratio is determined based on the average garbage data ratio and the average valid data ratio, in other words, the ratio of the average garbage data ratio to the average valid data ratio is obtained and determined to be the target ratio. This avoids dramatic fluctuations of the target ratio and improves the control stability.

The preset number of historical collected zones can be set based on an actual situation. The larger the preset number is, the smoother the control is. However, in response to the preset number being too large, the target ratio may not be adjusted significantly in a timely manner in an emergency, which may lead to a rapid decrease in the number of free zones in the zoned storage device, making the user fail to write data and causing poor system responsiveness. In addition, sizes of zones may vary between different zoned storage devices. Therefore, the sizes of the zones can also be considered during the determination of the preset number.

Figure 4:
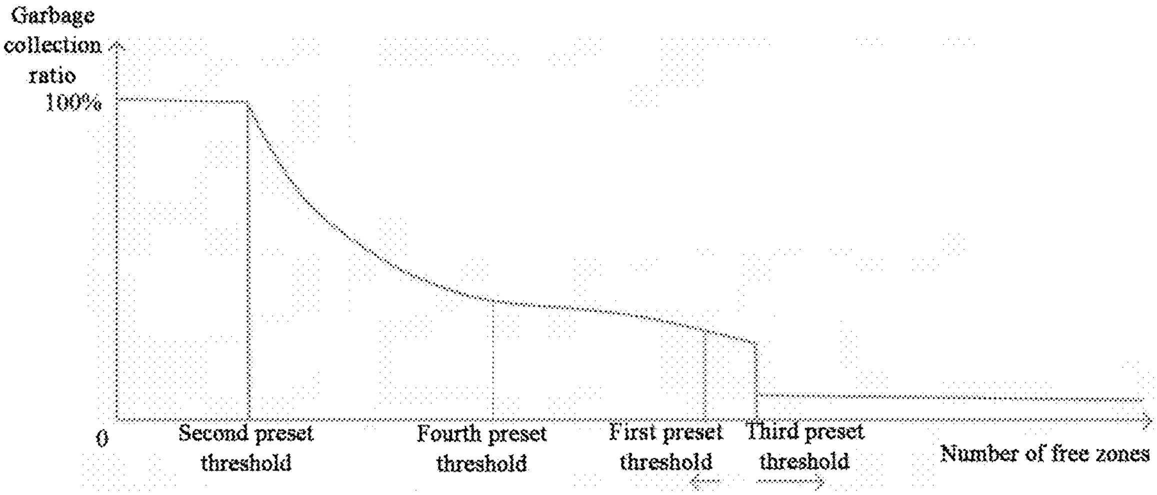
FIG. 4 is a schematic diagram of a staged control process of a zoned storage device according to an embodiment of the present disclosure.

Based on any one of the above embodiments, the zoned storage device can be dynamically controlled based on the number of free zones in the zoned storage device. As shown in FIG. 4, the horizontal axis represents the number of free zones, and the vertical axis represents the ratio (referred to as garbage collection ratio in FIG. 4) of the throughput for writing data in the garbage collection process to the total throughput for writing data, which can be equivalent to the target ratio in the above embodiments. For example, in response to the target ratio being 3:1, the ratio of the throughput for writing data in the garbage collection process to the total throughput for writing data is 3:4. This ratio can also be used for traffic scheduling control of the zoned storage device.

Specifically, considering that the larger the garbage data ratio in the zone to be collected is, the higher the efficiency of garbage collection is (a vast majority of spaces can be collected only by moving a small amount of valid data). Therefore, the longer it takes to start garbage collection, the better. In a case that the number of free zones of the system is reduced to an extent, in response to garbage collection being still not started, there may be a risk of write stop. At this time, it is the most efficient to start the garbage collection and control.

Therefore, in response to a large number of free zones in the zoned storage device existing, such as exceeding a first preset threshold, the zoned storage device may be controlled to process the first class request and the second class request without being based on the target ratio. Optionally, since there are many free zones, there are few zones that require garbage collection, so that the processing of the first class request can be reduced as much as possible. Even garbage collection can be avoided, and the processing of the second class request can be increased as much as possible, to minimize the throughput for writing data in the garbage collection process and increase the throughput for writing data to the zoned storage device by the user, in other words, to minimize the ratio of the throughput for writing data in the garbage collection process to the throughput for writing data to the zoned storage device by the user, which ensures the data write performance of the user.

In a case that the number of free zones of the zoned storage device gradually decreases, in response to the number of the free zones of the zoned storage device being reduced to be less than the first preset threshold and greater than the second preset threshold, it may be started to control the zoned storage device based on the target ratio to process the first class request and the second class request. In other words, the above S202 and the relevant solution are performed, where the second preset threshold is less than the first preset threshold, which will not be elaborated here.

In response to the number of free zones of the zoned storage device further decreasing to be less the second preset threshold, the number of free zones of the zoned storage device is very small. In this case, the zoned storage device can be controlled to only process the first class request and stop processing the second class request, to produce more free zones through garbage collection to increase the number of free zones of the zoned storage device and ensure that the zoned storage device is recovered to be normal. After the number of free zones of the zoned storage device increases to be greater than the second preset threshold, the zoned storage device can be continued to be controlled based on the target ratio to process the first class request and the second class request.

In addition, to prevent repeated fluctuations around respective amplitudes in the above process, smooth transitioning can be performed near thresholds, such as gradually strengthening and gradually weakening the control.

In addition, in a decrease stage of the number of free zones of the zoned storage device decreases, controlling the zoned storage device based on the target ratio to process the first class request and the second class request is started. In an increase stage of the number of free zones of the zoned storage device, controlling the zoned storage device based on the target ratio to process the first class request and the second class request is ended. An interval is also added, as shown in FIG. 4. In the decrease stage of the number of free zones of the zoned storage device, in response to the number decreasing to the first preset threshold, controlling the zoned storage device process based on the target ratio to process the first class request and the second class request is started. In the increase stage of the number of free zones of the zoned storage device, in response to the number increasing to a third preset threshold, controlling the zoned storage device based on the target ratio to process the first class request and the second class request is ended. The third preset threshold is greater than the first preset threshold. By using the interval between the first preset threshold and the third preset threshold, the control stability can be improved, thereby avoiding a situation that the start of the controlling the zoned storage device based on the target ratio to process the first class request and the second class request may lead to an increase in the number of free zones of the zoned storage device, resulting in the end of the controlling the zoned storage device based on the target ratio to process the first class request and the second class request, in other words, controlling and not controlling are repeatedly performed.

Optionally, in an ideal state that there is no disturbance in the zoned storage device system, after the number of free zones of the zoned storage device decreases to be less than the first preset threshold, the zoned storage device is controlled based on the target ratio to process the first class request and the second class request, and then the number of free zones of the zoned storage device may decrease to an ideal number and remain stable, in other words, the number of free zones will reach equilibrium. However, there may be actually a disturbance in the zoned storage device, which may lead to a continuous decrease in the number of free zones. Therefore, in this embodiment, positive compensation can be performed on the target ratio in a case of a continuous decrease in the number of free zones. In other words, in response to the number of free zones of the zoned storage device being less than a fourth preset threshold (i.e., to the ideal number, and the fourth preset threshold is between the first preset threshold and the second preset threshold), the positive compensation is performed on the target ratio to increase the target ratio, in other words, to increase the throughput for writing data in the garbage collection process, and the zoned storage device can be controlled based on the target ratio after the positive compensation to process the first class request and the second class request. In response to the number of free zones of the zoned storage device is greater than the fourth preset threshold, negative compensation is performed on the target ratio to reduce the target ratio, in other words, to reduce the throughput for writing data in the garbage collection process, and the zoned storage device can be controlled based on the target ratio after the negative compensation to process the first class request and the second class request. In other words, the fourth preset threshold is a turning point for positive compensation and negative compensation. Through the negative feedback compensation process mentioned above, faster and more efficient control can be ensured, so that the number of free zones of the zoned storage device can quickly return to the ideal number.

Figure 5:
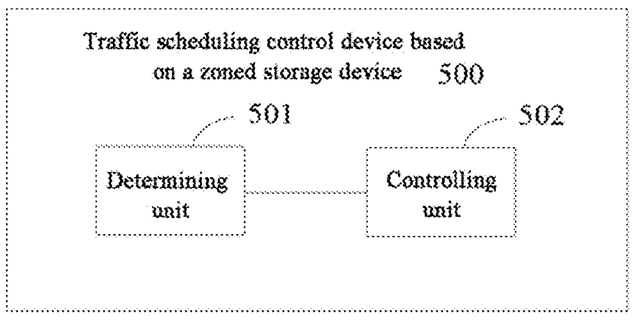
FIG. 5 is a structural block diagram of a traffic scheduling control device based on a zoned storage device according to an embodiment of the present disclosure.

Corresponding to the traffic scheduling control method based on the zoned storage device in the above embodiments, FIG. 5 is a structural block diagram of a traffic scheduling control device based on a zoned storage device according to an embodiment of the present disclosure. For ease of explanation, only parts related to the embodiments of the present disclosure are shown. Referring to FIG. 5, the traffic scheduling control device 500 based on the zoned storage device includes: a determining unit 501 and a controlling unit 502.

The determining unit 501 is configured to determine, based on a garbage data ratio and a valid data ratio of a current zone to be collected of the zoned storage device, a target ratio of a throughput for writing data in a garbage collection process of the current zone to be collected to a throughput for writing data to the zoned storage device by a user.

The controlling unit 502 is configured to control, based on the target ratio, the zoned storage device to process a first class request for writing data in the garbage collection process and a second class request for writing data to the zoned storage device by the user.

In one or more embodiments of the present disclosure, to determine, based on the garbage data ratio and the valid data ratio of the current zone to be collected of the zoned storage device, the target ratio of the throughput for writing data in the garbage collection process of the current zone to be collected to the throughput for writing data to the zoned storage device by the user, the determining unit 501 is configured to obtain a ratio between the valid data ratio of the current zone to be collected and the garbage data ratio of the current zone to be collected, and determine the ratio to be the target ratio.

In one or more embodiments of the present disclosure, to determine, based on the garbage data ratio and the valid data ratio of the current zone to be collected of the zoned storage device, the target ratio of the throughput for writing data in the garbage collection process of the current zone to be collected to the throughput for writing data to the zoned storage device by the user, the determining unit 501 is configured to obtain an average garbage data ratio of the garbage data ratio of the current zone to be collected and garbage data ratios of a preset number of historical collected zones, and obtain an average valid data ratio of the valid data ratio of the current zone to be collected and valid data ratios of a preset number of historical collected zones; and determine, based on the average garbage data ratio and the average valid data ratio, the target ratio of the throughput for writing data in the garbage collection process of the current zone to be collected to the throughput for writing data to the zoned storage device by the user.

In one or more embodiments of the present disclosure, to determine, based on the average garbage data ratio and the average valid data ratio, the target ratio of the throughput for writing data in the garbage collection process of the current zone to be collected to the throughput for writing data to the zoned storage device by the user, the determining unit 501 is configured to obtain a ratio between the average garbage data ratio and the average valid data ratio, and determine the ratio to be the target ratio.

In one or more embodiments of the present disclosure, to control, based on the target ratio, the zoned storage device to process the first class request for writing data in the garbage collection process and the second class request for writing data to the zoned storage device by the user, the controlling unit 502 is configured to in response to a number of free zones of the zoned storage device being reduced to be less than a first preset threshold and greater than a second preset threshold, control, based on the target ratio, the zoned storage device to process the first class request and the second class request, where the second preset threshold is less than the first preset threshold.

In one or more embodiments of the present disclosure, the controlling unit 502 is further configured to in response to the number of free zones of the zoned storage device being reduced to be less than the second preset threshold, control the zoned storage device to only process the first class request and stop processing the second class request.

In one or more embodiments of the present disclosure, the controlling unit 502 is further configured to in response to the number of free zones of the zoned storage device being increased to be greater than a third preset threshold, cancel the controlling, based on the target ratio, the zoned storage device to process the first class request and the second class request, where the third preset threshold is greater than the first preset threshold.

In one or more embodiments of the present disclosure, in response to the number of free zones of the zoned storage device being reduced to be less than the first preset threshold and greater than the second preset threshold, to control, based on the target ratio, the zoned storage device to process the first class request and the second class request, the controlling unit 502 is configured to in response to the number of free zones of the zoned storage device being less than a fourth preset threshold, perform positive compensation on the target ratio to increase the target ratio, and control, based on the target ratio after the positive compensation, the zoned storage device to process the first class request and the second class request; or in response to the number of free zones of the zoned storage device being greater than a fourth preset threshold, perform negative compensation on the target ratio to decrease the target ratio, and control, based on the target ratio after the negative compensation, the zoned storage device to process the first class request and the second class request, where the fourth preset threshold is between the first preset threshold and the second preset threshold.

In one or more embodiments of the present disclosure, to control, based on the target ratio, the zoned storage device to process the first class request for writing data in the garbage collection process and the second class request for writing data to the zoned storage device by the user, the controlling unit 502 is configured to add the first class requests into a first queue, and add the second class requests into a second queue; and control, based on the target ratio, the zoned storage device to obtain, from the first queue and/or the second queue, a request included in the first queue and/or the second queue and process the request.

In one or more embodiments of the present disclosure, to control, based on the target ratio, the zoned storage device to obtain, from the first queue and/or the second queue, the request included in the first queue and/or the second queue and process the request, the controlling unit 502 is configured to obtain, from the first queue and/or the second queue, the request included in the first queue and/or the second queue within a current sub time period within current unit time, and process the request; determine an actual ratio of a cumulative data volume of data written in the garbage collection processes, within the current sub time period and a historical sub time period in the current unit time, to a cumulative data volume of data written to the zoned storage device by the user, and determine an offset index between the actual ratio and the target ratio; and control, based on the offset index, the zoned storage device to continue to obtain, from the first queue and/or the second queue, a request included in the first queue and/or the second queue, within a next sub time period, until a total cumulative data volume of data written within the current unit time reaches a maximum written bandwidth threshold of the current unit time.

The device provided in this embodiment can be configured to implement the technical solutions of the method embodiments described above, and an implementation principle and technical effects thereof are similar to those of the method embodiments, and will not be described in detail in this embodiment.

Figure 6:
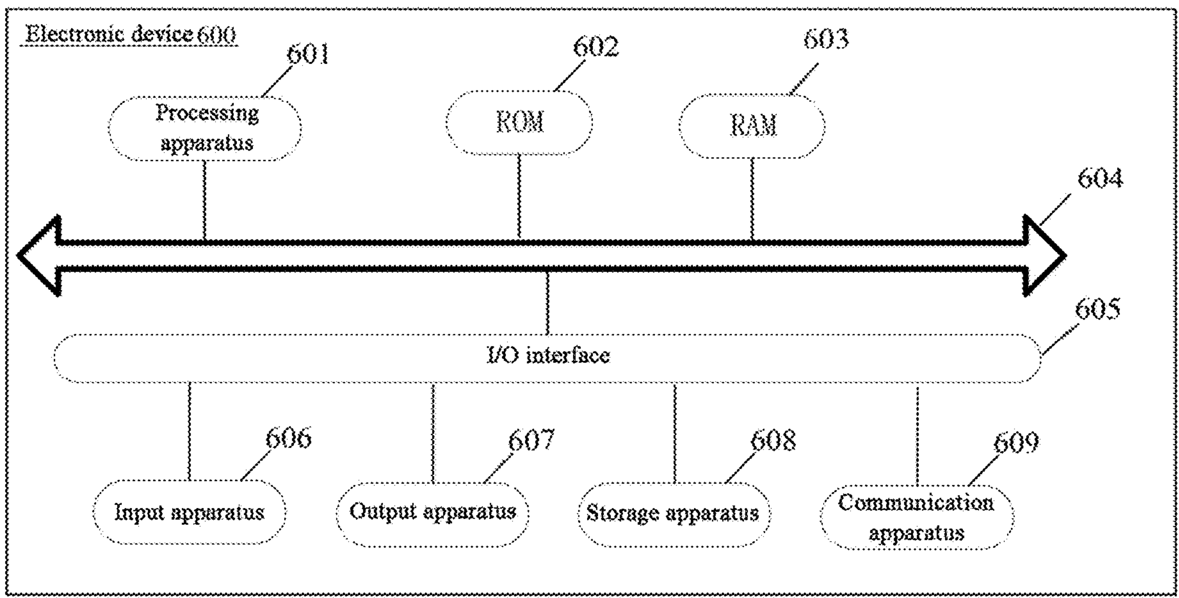
FIG. 6 is a schematic diagram of a hardware structure of an electronic device according to an embodiment of the present disclosure.

Further, referring to FIG. 6, a schematic structural diagram of an electronic device 600 suitable for implementing the embodiments of the present disclosure is shown. The electronic device 600 can be a terminal device or a server. The terminal device may include, but is not limited to, a mobile terminal such as a mobile phone, a notebook computer, a digital broadcast receiver, a personal digital assistant (PDA), a tablet computer (portable Android device, PAD), a portable media player (PMP), and a vehicle-mounted terminal (such as a vehicle navigation terminal); and a fixed terminal such as a digital TV and a desktop computer. The electronic device shown in FIG. 6 is merely an example, and shall not impose any limitation on the function and scope of use of the embodiments of the present disclosure.

As shown in FIG. 6, the electronic device 600 may include a processing apparatus (e.g., a central processing unit or a graphics processing unit) 601 that may perform a variety of appropriate actions and processing in accordance with a program stored in a read-only memory (ROM) 602 or a program loaded from a storage apparatus 608 into a random access memory (RAM) 603. The RAM 603 further stores various programs and data required for the operation of the electronic device 600. The processing apparatus 601, the ROM 602, and the RAM 603 are connected to each other through a bus 604. An Input/Output (I/O) interface 605 is also connected to the bus 604.

Usually, following apparatuses can be connected to the I/O interface 605: an input apparatus 606 including a touch screen, a touchpad, a keyboard, a mouse, a camera, a microphone, an accelerometer, a gyroscope, and the like; an output apparatus 607 including a Liquid Crystal Display (LCD), a speaker, a vibrator, and the like; a storage apparatus 608 including a magnetic tape, a hard disk drive, and the like; and a communication apparatus 609. The communication apparatus 609 can allow the electronic device 600 to wirelessly or wiredly communicate with other devices to exchange data. Although FIG. 6 shows the electronic device 600 with multiple apparatuses, it should be understood that the electronic device 600 is not required to implement or have all the apparatuses shown, and can alternatively implement or have more or fewer apparatuses.

Particularly, according to the embodiments of the present disclosure, the process described in the reference flowchart above can be implemented as a computer software program. For example, the embodiments of the present disclosure include a computer program product, including a computer program carried on a computer-readable medium, and the computer program includes program codes used for performing the methods shown in the flowcharts. In such an embodiment, the computer program may be downloaded and installed from a network through the communication apparatus 609, or installed from the memory 608, or installed from the ROM 602. When the computer program is executed by the processing apparatus 601, the above-mentioned functions defined in the methods of the embodiments of the present application are executed.

It should be noted that the computer-readable medium mentioned in the present disclosure can be a computer-readable signal medium, a computer-readable storage medium, or any combination of the computer-readable signal medium and the computer-readable storage medium. The computer-readable storage medium can be, for example, but not limited to, electric, magnetic, optical, electromagnetic, infrared, or semiconductor systems, apparatuses, or devices, or any combination of the above. More specific examples of the computer-readable storage medium may include, but are not limited to: an electrical connection with one or more wires, a portable computer disk, a hard disk drive, a RAM, a ROM, an Erasable Programmable Read Only Memory (EPROM) or flash memory, an optical fiber, a Compact Disc Read-Only Memory (CD-ROM), an optical storage device, a magnetic storage device, or any suitable combination of the above. In the present disclosure, the computer-readable storage medium may be any tangible medium that contains or stores a program, and the program can be used by or in combination with an instruction execution system, apparatus, or device. In the present disclosure, the computer-readable signal media may include data signals propagated in a baseband or as part of a carrier wave, which carries computer-readable program codes. The propagated data signals can be in various forms, including but not limited to: electromagnetic signals, optical signals, or any suitable combination of the above. The computer-readable signal medium may also be any computer-readable medium other than a computer-readable storage medium. The computer-readable signal medium can send, propagate, or transmit programs for use by or in combination with an instruction execution system, apparatus, or device. The program codes contained in the computer-readable medium can be transmitted using any suitable medium, including but are not limited to: a wire, an optical cable, a Radio Frequency (RF), and the like, or any suitable combination of the above.

The computer-readable medium may be included in the electronic device or exist alone and is not assembled into the electronic device.

The above computer-readable medium carries one or more programs. When executed by the electronic device, the one or more programs cause the electronic device to implement the methods shown in the above embodiments.

Computer program codes for performing the operations of the present disclosure may be written in one or more programming languages or a combination thereof. The above programming languages include an object-oriented programming language such as Java, Smalltalk, and C++, and conventional procedural programming languages such as "C" language or similar programming languages. The program codes may be executed entirely on a user computer, partly on a user computer, as a stand-alone software package, partly on a user computer and partly on a remote computer, or entirely on a remote computer or a server. In a case that a remote computer is involved, the remote computer can be connected to a user computer through any kind of networks, including a LAN or a WAN, or can be connected to an external computer (e.g., through an Internet using an Internet service provider).

The flowcharts and block diagrams in the accompanying drawings illustrate possible system architectures, functions, and operations that may be implemented by a system, a method, and a computer program product according to various embodiments of the present disclosure. In this regard, each block in a flowchart or a block diagram may represent a module, a program, or a part of a code. The module, the program, or the part of the code includes one or more executable instructions used for implementing specified logic functions. In some implementations used as substitutes, functions annotated in blocks may alternatively occur in a sequence different from that annotated in an accompanying drawing. For example, actually two blocks shown in succession may be performed basically in parallel, and sometimes the two blocks may be performed in a reverse sequence. This is determined by a related function. It is also be noted that each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The units described in the embodiments of the present application can be implemented through software or hardware. The name of the unit does not constitute a limitation on the unit itself. For example, the first obtaining unit can also be described as "a unit that obtains at least two Internet protocol addresses".

The functions described herein above may be performed, at least in part, by one or a plurality of hardware logic components. For example, nonrestrictively, example hardware logic components that can be used include: a Field Programmable Gate Array (FPGA), an Application Specific Integrated Circuit (ASIC), Application Specific Standard Parts (ASSP), a System on Chip (SOC), a Complex Programmable Logic Device (CPLD), and the like.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable medium may include an electrical connection based on one or more wires, a portable computer disk, a hard disk drive, a RAM, a ROM, an EPROM or flash memory, an optical fiber, a CD-ROM, an optical storage device, a magnetic storage device, or any suitable combinations of the above contents.

In a first aspect, according to one or more embodiments of the present disclosure, a traffic scheduling control method based on a zoned storage device is provided, including: determining, based on a garbage data ratio and a valid data ratio of a current zone to be collected of the zoned storage device, a target ratio of a throughput for writing data in a garbage collection process of the current zone to be collected to a throughput for writing data to the zoned storage device by a user; and controlling, based on the target ratio, the zoned storage device to process a first class request for writing data in the garbage collection process and a second class request for writing data to the zoned storage device by the user.

According to one or more embodiments of the present disclosure, determining, based on the garbage data ratio and the valid data ratio of the current zone to be collected of the zoned storage device, the target ratio of the throughput for writing data in the garbage collection process of the current zone to be collected to the throughput for writing data to the zoned storage device by the user includes: obtaining a ratio between the valid data ratio of the current zone to be collected and the garbage data ratio of the current zone to be collected, and determining the ratio to be the target ratio.

According to one or more embodiments of the present disclosure, determining, based on the garbage data ratio and the valid data ratio of the current zone to be collected of the zoned storage device, the target ratio of the throughput for writing data in the garbage collection process of the current zone to be collected to the throughput for writing data to the zoned storage device by the user includes: obtaining an average garbage data ratio of the garbage data ratio of the current zone to be collected and garbage data ratios of a preset number of historical collected zones, and obtaining an average valid data ratio of the valid data ratio of the current zone to be collected and valid data ratios of a preset number of historical collected zones; and determining, based on the average garbage data ratio and the average valid data ratio, the target ratio of the throughput for writing data in the garbage collection process of the current zone to be collected to the throughput for writing data to the zoned storage device by the user.

According to one or more embodiments of the present disclosure, determining, based on the average garbage data ratio and the average valid data ratio, the target ratio of the throughput for writing data in the garbage collection process of the current zone to be collected to the throughput for writing data to the zoned storage device by the user includes: obtaining a ratio between the average garbage data ratio and the average valid data ratio, and determine the ratio to be the target ratio.

According to one or more embodiments of the present disclosure, controlling, based on the target ratio, the zoned storage device to process the first class request for writing data in the garbage collection process and the second class request for writing data to the zoned storage device by the user includes: in response to a number of free zones of the zoned storage device being reduced to be less than a first preset threshold and greater than a second preset threshold, controlling, based on the target ratio, the zoned storage device to process the first class request and the second class request, where the second preset threshold is less than the first preset threshold.

According to one or more embodiments of the present disclosure, the method further includes: in response to the number of free zones of the zoned storage device being reduced to be less than the second preset threshold, controlling the zoned storage device to only process the first class request and stop processing the second class request.

According to one or more embodiments of the present disclosure, the method further includes: in response to the number of free zones of the zoned storage device being increased to be greater than a third preset threshold, canceling the controlling, based on the target ratio, the zoned storage device to process the first class request and the second class request, where the third preset threshold is greater than the first preset threshold.

According to one or more embodiments of the present disclosure, in response to the number of free zones of the zoned storage device being reduced to be less than the first preset threshold and greater than the second preset threshold, controlling, based on the target ratio, the zoned storage device to process the first class request and the second class request includes: in response to the number of free zones of the zoned storage device being less than a fourth preset threshold, performing positive compensation on the target ratio to increase the target ratio, and controlling, based on the target ratio after the positive compensation, the zoned storage device to process the first class request and the second class request; or in response to the number of free zones of the zoned storage device being greater than a fourth preset threshold, performing negative compensation on the target ratio to decrease the target ratio, and controlling, based on the target ratio after the negative compensation, the zoned storage device to process the first class request and the second class request, where the fourth preset threshold is between the first preset threshold and the second preset threshold.

According to one or more embodiments of the present disclosure, controlling, based on the target ratio, the zoned storage device to process the first class request for writing data in the garbage collection process and the second class request for writing data to the zoned storage device by the user includes: adding the first class requests into a first queue, and adding the second class requests into a second queue; and controlling, based on the target ratio, the zoned storage device to obtain, from the first queue and/or the second queue, a request included in the first queue and/or the second queue and process the request.

According to one or more embodiments of the present disclosure, controlling, based on the target ratio, the zoned storage device to obtain, from the first queue and/or the second queue, the request included in the first queue and/or the second queue and process the request includes: obtaining, from the first queue and/or the second queue, the request included in the first queue and/or the second queue within a current sub time period within current unit time, and processing the request; determining an actual ratio of a cumulative data volume of data written in the garbage collection processes, within the current sub time period and a historical sub time period in the current unit time, to a cumulative data volume of data written by the user to the zoned storage device, and determining an offset index between the actual ratio and the target ratio; and controlling, based on the offset index, the zoned storage device to continue to obtain, from the first queue and/or the second queue, a request included in the first queue and/or the second queue, within a next sub time period, until a total cumulative data volume of data written within the current unit time reaches a maximum written bandwidth threshold of the current unit time.

In a second aspect, according to one or more embodiments of the present disclosure, a traffic scheduling control device based on a zoned storage device is provided, including: a determining unit, configured to: determine, based on a garbage data ratio and a valid data ratio of a current zone to be collected of the zoned storage device, a target ratio of a throughput for writing data in a garbage collection process of the current zone to be collected to a throughput for writing data to the zoned storage device by a user; and a controlling unit, configured to control, based on the target ratio, the zoned storage device to process a first class request for writing data in the garbage collection process and a second class request for writing data to the zoned storage device by the user.

According to one or more embodiments of the present disclosure, to determine, based on the garbage data ratio and the valid data ratio of the current zone to be collected of the zoned storage device, the target ratio of the throughput for writing data in the garbage collection process of the current zone to be collected to the throughput for writing data to the zoned storage device by the user, the determining unit is configured to obtain a ratio between the valid data ratio of the current zone to be collected and the garbage data ratio of the current zone to be collected, and determine the ratio to be the target ratio.

According to one or more embodiments of the present disclosure, to determine based on the garbage data ratio and the valid data ratio of the current zone to be collected of the zoned storage device, the target ratio of the throughput for writing data in the garbage collection process of the current zone to be collected to the throughput for writing data to the zoned storage device by the user, the determining unit is configured to obtain an average garbage data ratio of the garbage data ratio of the current zone to be collected and garbage data ratios of a preset number of historical collected zones, and obtain an average valid data ratio of the valid data ratio of the current zone to be collected and valid data ratios of a preset number of historical collected zones; and determine, based on the average garbage data ratio and the average valid data ratio, the target ratio of the throughput for writing data in the garbage collection process of the current zone to be collected to the throughput for writing data to the zoned storage device by the user.

According to one or more embodiments of the present disclosure, to determine, based on the average garbage data ratio and the average valid data ratio, the target ratio of the throughput for writing data in the garbage collection process of the current zone to be collected to the throughput for writing data to the zoned storage device by the user, the determining unit is configured to obtain a ratio between the average garbage data ratio and the average valid data ratio, and determine the ratio to be the target ratio.

According to one or more embodiments of the present disclosure, to control, based on the target ratio, the zoned storage device to process the first class request for writing data in the garbage collection process and the second class request for writing data to the zoned storage device by the user, the controlling unit is configured to: in response to a number of free zones of the zoned storage device being reduced to be less than a first preset threshold and greater than a second preset threshold, control, based on the target ratio, the zoned storage device to process the first class request and the second class request, where the second preset threshold is less than the first preset threshold.

According to one or more embodiments of the present disclosure, the controlling unit is further configured to: in response to the number of free zones of the zoned storage device being reduced to be less than the second preset threshold, control the zoned storage device to only process the first class request and stop processing the second class request.

According to one or more embodiments of the present disclosure, the controlling unit is further configured to: in response to the number of free zones of the zoned storage device being increased to be greater than a third preset threshold, cancel the controlling, based on the target ratio, the zoned storage device to process the first class request and the second class request, where the third preset threshold is greater than the first preset threshold.

According to one or more embodiments of the present disclosure, in response to the number of free zones of the zoned storage device being reduced to be less than the first preset threshold and greater than the second preset threshold, to control, based on the target ratio, the zoned storage device to process the first class request and the second class request, the controlling unit is configured to: in response to the number of free zones of the zoned storage device being less than a fourth preset threshold, perform positive compensation on the target ratio to increase the target ratio, and control, based on the target ratio after the positive compensation, the zoned storage device to process the first class request and the second class request; or in response to the number of free zones of the zoned storage device being greater than a fourth preset threshold, perform negative compensation on the target ratio to decrease the target ratio, and control, based on the target ratio after the negative compensation, the zoned storage device to process the first class request and the second class request, where the fourth preset threshold is between the first preset threshold and the second preset threshold.

According to one or more embodiments of the present disclosure, to control, based on the target ratio, the zoned storage device to process the first class request for writing data in the garbage collection process and the second class request for writing data to the zoned storage device by the user, the controlling unit is configured to: add the first class requests into a first queue, and add the second class requests into a second queue; and control, based on the target ratio, the zoned storage device to obtain, from the first queue and/or the second queue, a request included in the first queue and/or the second queue and process the request.

According to one or more embodiments of the present disclosure, to control, based on the target ratio, the zoned storage device to obtain, from the first queue and/or the second queue, the request included in the first queue and/or the second queue and process the request, the controlling unit is configured to: obtain, from the first queue and/or the second queue, the request included in the first queue and/or the second queue within a current sub time period within current unit time, and processing the request; determine an actual ratio of a cumulative data volume of data written in the garbage collection processes, within the current sub time period and a historical sub time period in the current unit time, to a cumulative data volume of data written by the user to the zoned storage device, and determine an offset index between the actual ratio and the target ratio; and control, based on the offset index, the zoned storage device to continue to obtain, from the first queue and/or the second queue, a request included in the first queue and/or the second queue, within a next sub time period, until a total cumulative data volume of data written within the current unit time reaches a maximum written bandwidth threshold of the current unit time.

In a third aspect, according to one or more embodiments of the present disclosure, an electronic device is provided, and the electronic device includes: at least one processor and a memory. The memory stores computer-executable instructions; and the at least one processor is configured to execute the computer-executable instructions stored in the memory to cause the at least one processor to perform the traffic scheduling control method based on the zoned storage device in the first aspect and in various possible designs of the first aspect.

In a fourth aspect, according to one or more embodiments of the present disclosure, a computer-readable storage medium is provided. The computer-readable storage medium stores computer-executable instructions which, when executed by a processor, implement the traffic scheduling control method based on the zoned storage device in the first aspect and in various possible designs of the first aspect.

In a fifth aspect, according to one or more embodiments of the present disclosure, a computer program product is provided, and the computer program product includes computer-executable instructions which, when executed by a processor, implement the traffic scheduling control method based on the zoned storage device in the first aspect and in various possible designs of the first aspect.

The foregoing descriptions are merely preferred embodiments of the present disclosure and explanations of the applied technical principles. Those skilled in the art should understand that the scope of disclosure referred to in the present disclosure is not limited to the technical solutions formed by specific combinations of the aforementioned technical features, but also covers other technical solutions formed by any combinations of the aforementioned technical features or their equivalent features without departing from the concept of the above disclosure, for example, a technical solution formed by replacing the above features with (but not limited to) technical features with similar functions disclosed in the present disclosure.

In addition, although various operations are depicted in a specific order, this should not be understood as requiring these operations to be executed in the specific order shown or in a sequential order. In certain environments, multitasking and parallel processing may be advantageous. Similarly, although several specific implementation details are included in the above discussion, these should not be interpreted as limiting the scope of the present disclosure. Some features described in the context of individual embodiments can also be combined and implemented in a single embodiment. On the contrary, various features that are described in the context of the single embodiment may also be implemented in a plurality of embodiments separately or in any suitable sub-combinations.

Although the subject matter has been described in a language specific to structural features and/or method logical actions, it should be understood that the subject matter limited in the attached claims may not necessarily be limited to the specific features or actions described above. On the contrary, the specific features and actions described above are only exemplary forms for implementing the claims.

We claim:

1. A traffic scheduling control method based on a zoned storage device, comprising:

determining, based on a garbage data ratio and a valid data ratio of a current zone to be collected of the zoned storage device, a target ratio of a throughput for writing data in a garbage collection process of the current zone to be collected to a throughput for writing data to the zoned storage device by a user; and controlling, based on the target ratio, the zoned storage device to process a first class request for writing data in the garbage collection process and a second class request for writing data to the zoned storage device by the user.

2. The method according to claim 1, wherein determining, based on the garbage data ratio and the valid data ratio of the current zone to be collected of the zoned storage device, the target ratio of the throughput for writing data in the garbage collection process of the current zone to be collected to the throughput for writing data to the zoned storage device by the user comprises:

obtaining a ratio between the valid data ratio of the current zone to be collected and the garbage data ratio of the current zone to be collected, and determining the ratio to be the target ratio.

3. The method according to claim 1, wherein determining, based on the garbage data ratio and the valid data ratio of the current zone to be collected of the zoned storage device, the target ratio of the throughput for writing data in the garbage collection process of the current zone to be collected to the throughput for writing data to the zoned storage device by the user comprises:

obtaining an average garbage data ratio of the garbage data ratio of the current zone to be collected and garbage data ratios of a preset number of historical collected zones, and obtaining an average valid data ratio of the valid data ratio of the current zone to be collected and valid data ratios of the preset number of historical collected zones; and determining, based on the average garbage data ratio and the average valid data ratio, the target ratio of the throughput for writing data in the garbage collection process of the current zone to be collected to the throughput for writing data to the zoned storage device by the user.

4. The method according to claim 1, wherein controlling, based on the target ratio, the zoned storage device to process the first class request for writing data in the garbage collection process and the second class request for writing data to the zoned storage device by the user comprises:

in response to a number of free zones of the zoned storage device being reduced to be less than a first preset threshold and greater than a second preset threshold, controlling, based on the target ratio, the zoned storage device to process the first class request and the second class request, wherein the second preset threshold is less than the first preset threshold.

5. The method according to claim 4, further comprising:

in response to the number of free zones of the zoned storage device being reduced to be less than the second preset threshold, controlling the zoned storage device to only process the first class request and stop processing the second class request.

6. The method according to claim 4, further comprising:

in response to the number of free zones of the zoned storage device being increased to be greater than a third preset threshold, canceling the controlling, based on the target ratio, the zoned storage device to process the first class request and the second class request, wherein the third preset threshold is greater than the first preset threshold.

7. The method according to claim 4, wherein in response to the number of free zones of the zoned storage device being reduced to be less than the first preset threshold and greater than the second preset threshold, controlling, based on the target ratio, the zoned storage device to process the first class request and the second class request comprises:

in response to the number of free zones of the zoned storage device being less than a fourth preset threshold, performing positive compensation on the target ratio to increase the target ratio, and controlling, based on the target ratio after the positive compensation, the zoned storage device to process the first class request and the second class request; or in response to the number of free zones of the zoned storage device being greater than a fourth preset threshold, performing negative compensation on the target ratio to decrease the target ratio, and controlling, based on the target ratio after the negative compensation, the zoned storage device to process the first class request and the second class request, wherein the fourth preset threshold is between the first preset threshold and the second preset threshold.

8. The method according to claim 1, wherein controlling, based on the target ratio, the zoned storage device to process the first class request for writing data in the garbage collection process and the second class request for writing data to the zoned storage device by the user comprises:

adding the first class request into a first queue, and adding the second class request into a second queue; and controlling, based on the target ratio, the zoned storage device to obtain, from at least one of the first queue or the second queue, a request comprised in the at least one of the first queue or the second queue and process the request.

9. The method according to claim 8, wherein controlling, based on the target ratio, the zoned storage device to obtain, from the at least one of the first queue or the second queue, the request comprised in the at least one of the first queue or the second queue and process the request comprises:

obtaining, from the at least one of the first queue or the second queue, a request comprised in the at least one of the first queue or the second queue, within a current sub time period within current unit time, and processing the request;

determining an actual ratio of a cumulative data volume of data written in the garbage collection processes, within the current sub time period and a historical sub time period in the current unit time, to a cumulative data volume of data written to the zoned storage device by the user, and determining an offset index between the actual ratio and the target ratio; and controlling, based on the offset index, the zoned storage device to continue to obtain, from the at least one of the first queue or the second queue, a request comprised in the at least one of the first queue or the second queue, within a next sub time period, until a total cumulative data volume of data written within the current unit time reaches a maximum written bandwidth threshold of the current unit time.

10. A non-transitory computer-readable storage medium storing computer-executable instructions which, when executed by a processor, configure the processor to:

determine, based on a garbage data ratio and a valid data ratio of a current zone to be collected of a zoned storage device, a target ratio of a throughput for writing data in a garbage collection process of the current zone to be collected to a throughput for writing data to the zoned storage device by a user, and control, based on the target ratio, the zoned storage device to process a first class request for writing data in the garbage collection process and a second class request for writing data to the zoned storage device by the user.

11. The non-transitory computer-readable storage medium according to claim 10, wherein, to determine, based on the garbage data ratio and the valid data ratio of the current zone to be collected of the zoned storage device, the target ratio of the throughput for writing data in the garbage collection process of the current zone to be collected to the throughput for writing data to the zoned storage device by the user, the processor is configured to:

obtain a ratio between the valid data ratio of the current zone to be collected and the garbage data ratio of the current zone to be collected, and determine the ratio to be the target ratio.

12. An electronic device, comprising at least one processor and a memory, wherein the memory stores computer-executable instructions; and the at least one processor is configured to execute the computer-executable instructions stored in the memory, to:

determine, based on a garbage data ratio and a valid data ratio of a current zone to be collected of a zoned storage device, a target ratio of a throughput for writing data in a garbage collection process of the current zone to be collected to a throughput for writing data to the zoned storage device by a user; and control, based on the target ratio, the zoned storage device to process a first class request for writing data in the garbage collection process and a second class request for writing data to the zoned storage device by the user.

13. The electronic device according to claim 12, wherein, to determine, based on the garbage data ratio and the valid data ratio of the current zone to be collected of the zoned storage device, the target ratio of the throughput for writing data in the garbage collection process of the current zone to be collected to the throughput for writing data to the zoned storage device by the user, the at least one processor is configured to:

obtain a ratio between the valid data ratio of the current zone to be collected and the garbage data ratio of the current zone to be collected, and determine the ratio to be the target ratio.

14. The electronic device according to claim 12, wherein, to determine, based on the garbage data ratio and the valid data ratio of the current zone to be collected of the zoned storage device, the target ratio of the throughput for writing data in the garbage collection process of the current zone to be collected to the throughput for writing data to the zoned storage device by the user, the at least one processor is configured to:

obtain an average garbage data ratio of the garbage data ratio of the current zone to be collected and garbage data ratios of a preset number of historical collected zones, and obtain an average valid data ratio of the valid data ratio of the current zone to be collected and valid data ratios of the preset number of historical collected zones; and determine, based on the average garbage data ratio and the average valid data ratio, the target ratio of the throughput for writing data in the garbage collection process of the current zone to be collected to the throughput for writing data to the zoned storage device by the user.

15. The electronic device according to claim 12, wherein, to control, based on the target ratio, the zoned storage device to process the first class request for writing data in the garbage collection process and the second class request for writing data to the zoned storage device by the user, the at least one processor is configured to:

in response to a number of free zones of the zoned storage device being reduced to be less than a first preset threshold and greater than a second preset threshold, control, based on the target ratio, the zoned storage device to process the first class request and the second class request, wherein the second preset threshold is less than the first preset threshold.

16. The electronic device according to claim 15, wherein the at least one processor is further configured to:

in response to the number of free zones of the zoned storage device being reduced to be less than the second preset threshold, control the zoned storage device to only process the first class request and stop processing the second class request.

17. The electronic device according to claim 15, wherein the at least one processor is further configured to:

in response to the number of free zones of the zoned storage device being increased to be greater than a third preset threshold, cancel the controlling, based on the target ratio, the zoned storage device to process the first class request and the second class request, wherein the third preset threshold is greater than the first preset threshold.

18. The electronic device according to claim 15, wherein, in response to the number of free zones of the zoned storage device being reduced to be less than the first preset threshold and greater than the second preset threshold, to control, based on the target ratio, the zoned storage device to process the first class request and the second class request, the at least one processor is configured to:

in response to the number of free zones of the zoned storage device being less than a fourth preset threshold, perform positive compensation on the target ratio to increase the target ratio, and control, based on the target ratio after the positive compensation, the zoned storage device to process the first class request and the second class request; or in response to the number of free zones of the zoned storage device being greater than a fourth preset threshold, perform negative compensation on the target ratio to decrease the target ratio, and control, based on the target ratio after the negative compensation, the zoned storage device to process the first class request and the second class request, wherein the fourth preset threshold is between the first preset threshold and the second preset threshold.

19. The electronic device according to claim 12, wherein, to control, based on the target ratio, the zoned storage device to process the first class request for writing data in the garbage collection process and the second class request for writing data to the zoned storage device by the user, the at least one processor is configured to:

add the first class request into a first queue, and add the second class request into a second queue; and control, based on the target ratio, the zoned storage device to obtain, from at least one of the first queue or the second queue, a request comprised in the at least one of the first queue or the second queue and process the request.

20. The electronic device according to claim 19, wherein, to control, based on the target ratio, the zoned storage device to obtain, from the at least one of the first queue or the second queue, the request comprised in the at least one of the first queue or the second queue and process the request, the at least one processor is configured to:

obtain, from the at least one of the first queue or the second queue, a request comprised in the at least one of the first queue or the second queue, within a current sub time period within current unit time, and process the request;

determine an actual ratio of a cumulative data volume of data written in the garbage collection processes, within the current sub time period and a historical sub time period in the current unit time, to a cumulative data volume of data written to the zoned storage device by the user, and determine an offset index between the actual ratio and the target ratio; and control, based on the offset index, the zoned storage device to continue to obtain, from the at least one of the first queue or the second queue, a request comprised in the at least one of the first queue or the second queue, within a next sub time period, until a total cumulative data volume of data written within the current unit time reaches a maximum written bandwidth threshold of the current unit time.

* * * * *